US012591388B1

(12) United States Patent
Levy et al.

(10) Patent No.: US 12,591,388 B1
(45) Date of Patent: Mar. 31, 2026

(54) HANDLING EXCESS BANDWIDTH IN A STORAGE SYSTEM

(71) Applicant: VAST DATA LTD., Tel Aviv (IL)

(72) Inventors: Asaf Levy, Tel Aviv (IL); Avi Goren, Tel Aviv (IL); Itay Khazon, Tel Aviv (IL); Ilan Ben-Hagai, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 0 days.

(21) Appl. No.: 18/783,361

(22) Filed: Jul. 24, 2024

(51) Int. Cl.
G06F 3/06 (2006.01)

(52) U.S. Cl.
CPC .......... G06F 3/0656 (2013.01); G06F 3/0613 (2013.01); G06F 3/0679 (2013.01)

(58) Field of Classification Search
CPC ..... G06F 3/0656; G06F 3/0613; G06F 3/0679
See application file for complete search history.

(56) References Cited

U.S. PATENT DOCUMENTS

| | | | |
|---|---|---|---|
| 9,274,966 B1 * | 3/2016 | Chahwan | G06F 12/0866 |
| 12,099,443 B1 * | 9/2024 | Tal | G06F 12/0868 |
| 12,182,421 B1 * | 12/2024 | Vankamamidi | G06F 3/0641 |
| 2019/0004949 A1 * | 1/2019 | Kim | G06F 12/0246 |
| 2022/0269435 A1 * | 8/2022 | Yoon | G06F 3/0659 |
| 2023/0229347 A1 * | 7/2023 | Zilberstein | G06F 3/068 711/154 |
| 2023/0281120 A1 * | 9/2023 | Reuter | G06F 3/0679 707/813 |
| 2024/0281144 A1 * | 8/2024 | Gohain | G06F 12/0246 |
| 2024/0311291 A1 * | 9/2024 | Kanno | G06F 12/0246 |
| 2025/0117144 A1 * | 4/2025 | Akavaram | G06F 3/0619 |
| 2025/0190118 A1 * | 6/2025 | Lee | G06F 3/0614 |

* cited by examiner

*Primary Examiner* — Edward J Dudek, Jr.
(74) *Attorney, Agent, or Firm* — Reches Patents

(57) ABSTRACT

A method for managing write buffers (WBs), that includes (i) receiving write requests for writing input information units (IIUs) to the storage system; (ii) estimating an occurrence of a future overflow of first WBs that are allocated, during steady state operation, to store IIUs before the IIUs are processed and migrated to a permanent storage; and (iii) responding to the estimating by (a) storing at least some IIUs at second WBs without temporarily storing the at least some of the IIUs in the first WBs; (b) reducing a rate of a migration of IIUs from the first WBs and the second WBs to the permanent storage; and (c) introducing intentional delays in handling an ingestion of one or more newly received write requests.

16 Claims, 4 Drawing Sheets

Receiving write requests for writing input information units to the storage system. 310

Estimating, by a monitoring circuit of a storage system, an occurrence of a future overflow of first write buffers 320

Responding to the estimating. 330

Storing at least some of the input information units at second write buffers without temporarily storing the at least some of the input information units in the first write buffers. 332

Reducing a rate of a migration of input information units from the first write buffers and the second write buffers to the permanent storage. 334

Introducing intentional delays in handling an ingestion of one or more newly received write requests. 336

NO

Did the responding of step 330 prevent the occurrence of the future overflow of first write buffers ? 340

YES

Returning to the steady state mode. 350

Storing input information units only to in first write buffers. 352

Increasing the rate of the migration of input information units from the first write buffers and the second write buffers to the permanent storage. 344

Stopping to introduce intentional delays in handling an ingestion of one or more newly received write requests. 356

300

Receiving write requests for writing input information units to the storage system. 310

Estimating, by a monitoring circuit of a storage system, an occurrence of a future overflow of first write buffers 320

Responding to the estimating. 330

Storing at least some of the input information units at second write buffers without temporarily storing the at least some of the input information units in the first write buffers. 332

Reducing a rate of a migration of input information units from the first write buffers and the second write buffers to the permanent storage. 334

Introducing intentional delays in handling an ingestion of one or more newly received write requests. 336

Did the responding of step 330 prevent the occurrence of the future overflow of first write buffers ? 340

NO

YES

Returning to the steady state mode. 350

Storing input information units only to in first write buffers. 352

Increasing the rate of the migration of input information units from the first write buffers and the second write buffers to the permanent storage. 344

Stopping to introduce intentional delays in handling an ingestion of one or more newly received write requests. 356

HANDLING EXCESS BANDWIDTH IN A STORAGE SYSTEM

Storage systems are required to cope with ever increasing Input/output (I/O) bandwidth produced by applications that use the storage space provided by the storage system. The term bandwidth refers to the amount of data received and ingested by the storage system per time unit.

In addition to the ongoing I/O flow, storage systems need to be prepared for a sudden and temporal increase in the bandwidth, and to be able to absorb temporal bursts of bulk data produced by applications.

One example of dealing with huge bursts is when the users of the storage system are artificial intelligence applications. In this case for example, during model training, the GPUs participating in the training perform a checkpoint process where they dump their huge memory to the storage system. The storage system is therefore required to be able to absorb a huge amount of data within a short time period of the checkpoint process.

There is a need for the storage system to be able to absorb huge bursts of data entering the system, which may even exceed the regular absorption capabilities of the system available for regular IO flows, while not using extra hardware only for coping with bursts SUMMARY There may be provided a method, a system and a non-transitory computer readable medium as illustrated in the application.

BRIEF DESCRIPTION OF THE DRAWINGS

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings in which:

FIG. 3 is an example of a method; and

DETAILED DESCRIPTION OF THE DRAWINGS

The storage system described herein ingests incoming data of write requests entering the system. In order to improve the latency experienced by the users, the ingestion form a first stage of storing and includes writing the data to a first type of storage space, without further data manipulation (compression, encryption, deduplication, etc.), except for some metadata adjustments that will allow reading and updating the data while being stored in the first type storage space, as well as sufficient redundancy. The first stage (the ingestion) ends when the data of the write request is safely stored in the first type storage space and the requesting user (e.g., application) is acknowledged. The second stage of storing is performed as part of a background process, and includes migrating the data from the first type storage space to a second type storage space that is much larger than the first type storage space. The migration may involve further operations such as: RAID striping, compression, deduplication, encryption, etc. The first type storage space includes first type storage devices (such as SCM, NVRAM, or any other fast flash) that are faster than the second type storage devices of the second type storage space, wherein the latter may be low-cost flash devices. The first type storage space is divided into write buffers that serve as a temporary storage space for storing data in its temporary format (e.g., uncompressed, non-encrypted, non-striped or striped). The second type of storage space stores the data in its permanent format (compressed, encrypted, deduplicated, striped), and is considered as a permanent storage space.

According to embodiments of the invention, part of the second type storage space may be used to store additional write buffers (in addition to the write buffers in the first type storage space) to accommodate burst data, on demand. Therefore, the first type storage space includes first type write buffers that are used when there are no bursts and the second type storage space allocates second type write buffers when there are bursts, for storing burst data, in addition to the first type write buffers. The second type storage space now includes both: (i) data in its permanent format, (ii) write buffers for temporarily storing data before being migrated. Using the second type write buffers during bursts only, is important so as not to hurt the limited endurance of the flash drives that compose the second type storage space.

Figure 1:
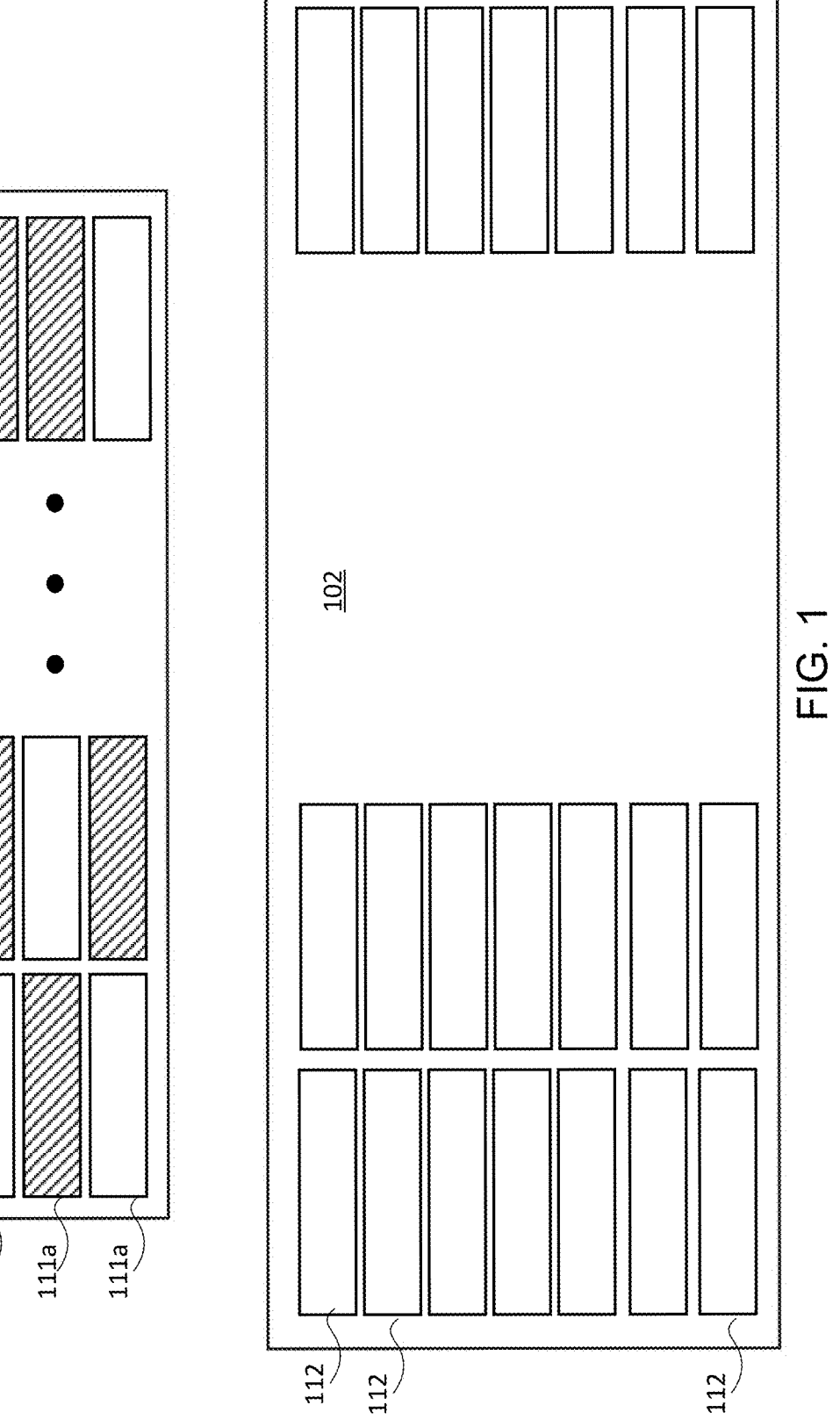
FIG. 1 is an example of two storage spaces in a storage system.

FIG. 1 illustrates the first type storage space 101 and the second type storage space 102, when the storage system operates in a normal operation mode. First type storage space 101 includes write buffers 111$a$, where some of the write buffers are illustrated as being full, storing data (filled with diagonal lines in the figure) and some are empty and ready to absorb newly written data. Second type storage space 102 stores data using other type of logical storage units, for example, logical storage units 112, which may be stripes, blocks, sections, or other logical storage units that stores data in its permanent format.

Figure 2:
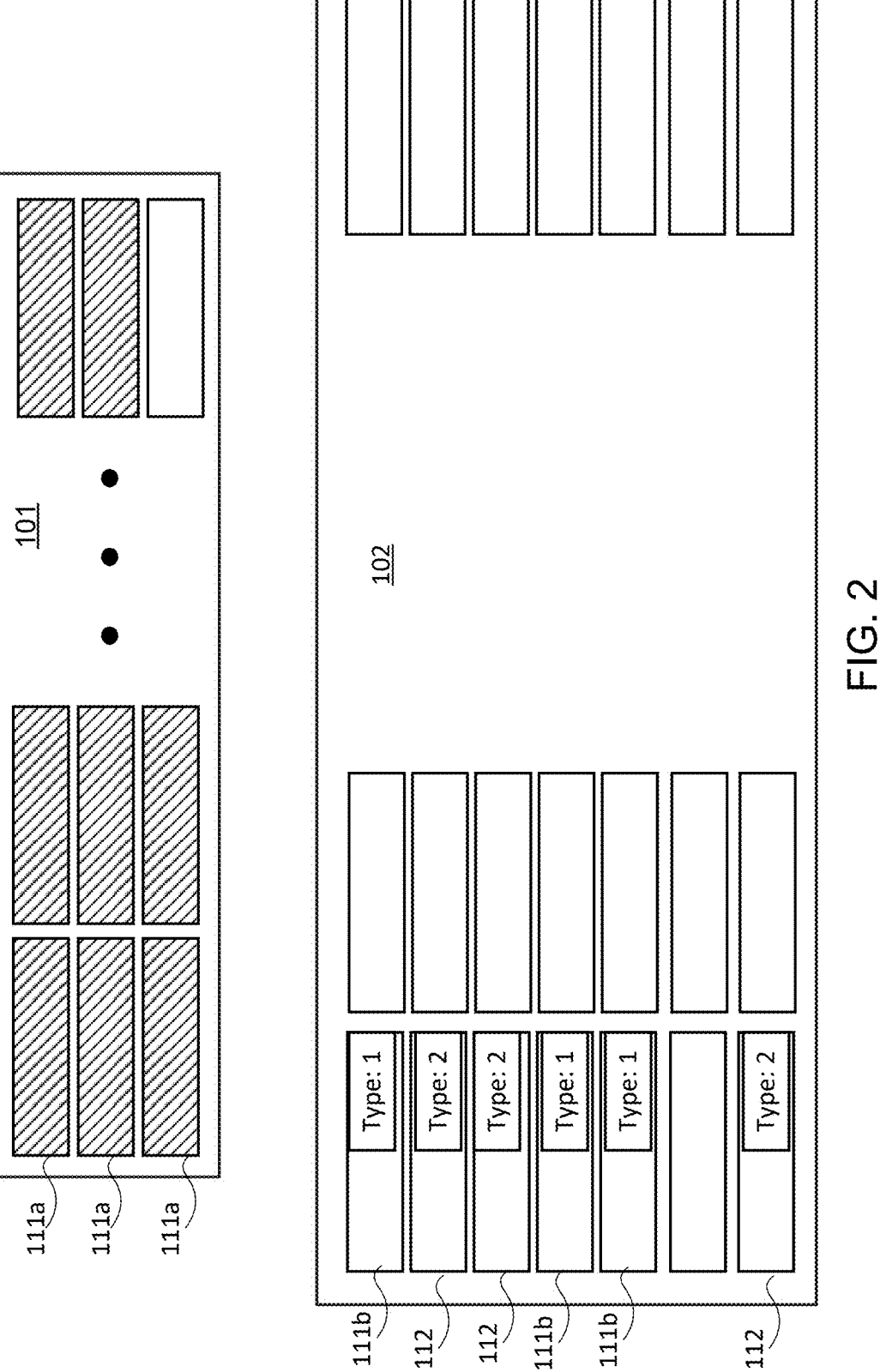
FIG. 2 is another example of two storage spaces in a storage system.

FIG. 2 illustrates the first and second storage spaces 101 and 102, when the storage system operates in a burst (excess bandwidth) operation mode. FIG. 2 illustrates first type storage space 101 as being almost full (which may be a trigger for entering the burst mode). When in burst mode, the second type storage space 102 includes two types of stored data, which may have a different format: (i) logical storage units 112, that includes data in its permanent format; and (ii) write buffers 111$b$ that temporarily stores incoming data during a burst mode. The second storage space 102 may be divided into two pools of storage for the two types of stored data, or otherwise, as illustrated in FIG. 2, each logical storage unit may indicate whether it serves as a write buffer, (e.g., indicated by 'type: 1') or permanent stored data (e.g., indicated by: 'type: 2').

Excess bandwidth is detected when the ingest bandwidth exceeds a first bandwidth threshold that corresponds to the maximum bandwidth ingestion capability of the first type storage space, e.g., 90%, 95%, 99% of the maximum bandwidth ingestion capability of the first type storage space. The maximum bandwidth ingestion capability of the first type storage space refers to the amount of incoming data that can be stored per second (or other time unit), which depends on the number and type of storage devices included in the first type storage space, and further depends on the computing resources of the storage system, e.g., a number of compute nodes, the number of compute cores in each compute node, and their types. Exceeding the first bandwidth threshold will be detected as a burst, only when the period, during which the first bandwidth threshold is exceeded, is longer than a certain duration of excess bandwidth.

When detecting a burst, the storage system enters a burst-mode. While the system is in the burst mode, a portion of the second type storage space will be allocated for write buffers, for temporarily storing at least part of the incoming data, instead of storing all the incoming data in the write buffers of the first type storage space. The portion may be proportional to the extent of the burst, i.e., the amount of the current ingest bandwidth exceeding the first bandwidth threshold, and may be changed during the period of the burst mode. The portion is further responsive to the current state of free space in both the first and second storage spaces. In a case where the second type storage space is substantially larger than the first type storage space (e.g., ten times larger, or more)—it may be determined to store incoming data only in second type write buffers, since the contribution of the first type write buffers, for storing incoming data, is negligible.

During or at the beginning of the burst mode, it may be determined which part of the incoming data will be stored in the first type write buffers and which part of the incoming data will be stored in the second type write buffers. Since the number of second type write buffers is much larger than the number of first type write buffers, it may be preferred to store new data in the second type write buffers over storing in the first type write buffers. For example, the usage relation between usage of write buffers in the first versus the second storage space, may be 30%:70%, 25%:75%, 10%:90%, etc. This relation between the usage of write buffers of the two storage spaces may be determined based on the extent of the burst (how much of the monitored incoming bandwidth exceeds the maximum bandwidth capabilities of the first type storage space) and the current state of free space in both storage spaces.

For each incoming write request during a burst mode, it is determined whether to store the data of the write request in a first or second type write buffer, based on the determined usage relation. If the usage relation is set to 25%:75%, then for every first type write buffer allocated for storing new data, three second type write buffer are allocated for storing new data.

In order to avoid excess workload on the controllers of the second type storage devices when experiencing large bursts and to increase the absorption capability of the second type storage space—migration (from the temporary storage format in the write buffers to permanent storage format in the second type storage space) is halted, so there is no workload on the second type storage devices that corresponds to writes related to permanent storing of data in its permanent format.

The halting of the migration reduces the workload on the second type storage devices, since only writing to write buffers is performed, which allows a faster ingestion of the burst, since the second type storage devices would handle only writing new data entering the system that origins from the user applications, and would not handle writing new data that origins from the write buffers.

The migration is resumed when either: (i) the percentage of full write buffers (of the total write buffers) exceeds a first fullness threshold, or (ii) the burst is terminated. In either case, there may be a heavy workload imposed on the migration process that needs to catch up the backlog of write buffers that were not migrated (when the migration was halted) in addition to handling the regular ingest bandwidth that continues entering the system.

A migration workload problem is detected when the pace of the ingestion is higher than the pace of the migration, and the relation between these two paces is not lessen over time. There is a need to assure that the pace of migration is higher than the pace of ingestion, by at least a certain amount, for example, the bandwidth of data evicted from the write buffers and written to its permanent location, as part of the migration, should be higher by at least, e.g. 10%-30%, of the bandwidth of incoming data being written in the write buffers. If this difference between the migration bandwidth and the ingestion bandwidth is not achieved, then the ingest flow should be slowed down.

Slowing down the ingest flow is done by suspending the execution of handling write requests. The suspension of handling a write request can be applied before starting the handling, when completing the handling and before sending an acknowledgement to the user, or upon any other stage of handling a write request.

The duration of the suspension can vary from e.g., 1 millisecond up to 10 seconds or more, and it depends on the percentage of full write buffers (and particularly the second type write buffers, which need to be evicted before returning to normal operating mode) and the time passed since the migration was resumed. It is expected that as time passes, the percentage of full write buffers will decrease, until there are no more full write buffers in the second type storage space, and the normal mode of operation is achieved (i.e., using only first type write buffers). Upon resuming the migration, the suspension of handling a write request may not be applied at first, regardless of the number of full write buffers, since the migration may cope with the backlog of write buffers to be migrated. The suspension may be applied as time passes since restarting the migration, wherein the duration of the suspension depends on the pace of eviction of write buffers, the pace of ingestion into the write buffers, and the time passed since the resuming of the migration.

The suspension of handling write requests continues until: (i) the burst is terminated and there are no more write buffers in the second storage space, or (ii) the burst is not terminated and the percentage of full write buffers in the second type storage space drops below a second fullness threshold that is lower than the first fullness threshold.

The burst mode is terminated when the incoming bandwidth drops below a second bandwidth threshold, that is lower than the first bandwidth threshold that triggered entering the burst mode. The second bandwidth threshold takes into account a certain safety margin with regard to the maximum bandwidth ingestion capability of the first type storage space, e.g., when the incoming bandwidth drops below 80% of the maximum bandwidth ingestion capability of the first type storage space.

Figure 3:
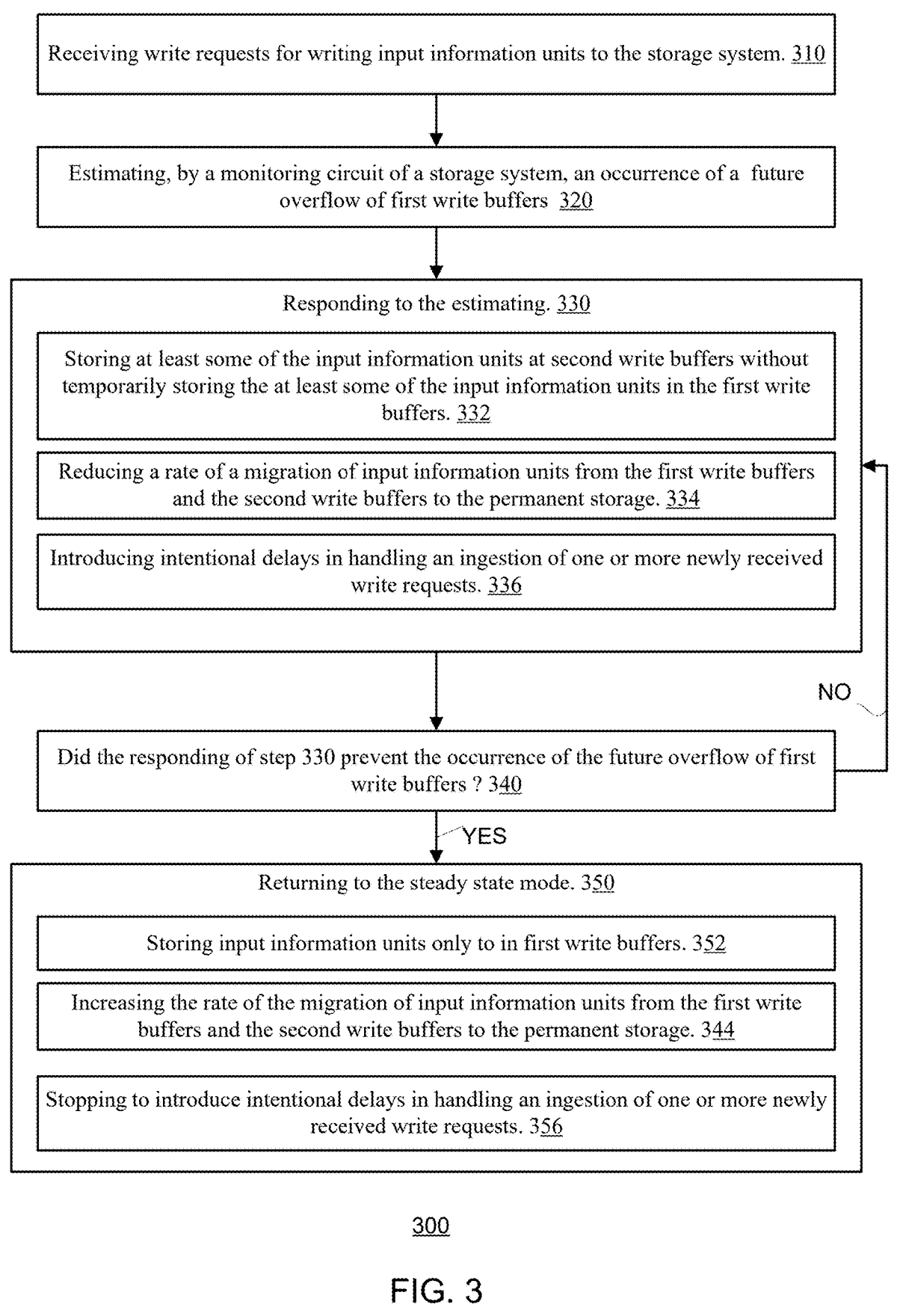

FIG. 3 illustrates method 300 for managing write buffers of a storage system.

According to an embodiment, method 300 starts by step 310 of receiving write requests for writing input information units to the storage system. Step 310 may be continued and repeated regardless of the execution of other steps of method 300. The receiving is from one or more users (e.g., applications) that are external to the storage system. The input information units may include data and/or metadata (e.g., new filenames).

According to an embodiment, step 310 is followed by step 320 of estimating, by a monitoring unit of a storage system, an occurrence of a future overflow of first write buffers that are allocated, during steady state operation, to store input information units before the input information units are processed and migrated to a permanent storage. The processing that is related to migration may include: compression, deduplication, encryption, and redundancy mechanism. The initial storing of the input information units in the first write buffers, before migration, may include a basic processing, but not all the processing involved in the migration. For example, the basic processing may include applying some redundancy mechanism, and some metadata addition, but may not include deduplication, compression, and encryption, or include a lighter version of these mechanisms.

According to an embodiment, step 320 is based on a relationship between a current ingest bandwidth and an ingest bandwidth limitation of the first write buffers.

According to an embodiment the ingest bandwidth limitation is a maximal ingest bandwidth value and the method comprising estimating the occurrence of the future overflow of the first write buffers when the current ingest bandwidth reaches at least a certain portion, e.g., seventy five percent of the maximal ingest bandwidth value. The estimating of the occurrence of the future overflow may be when the ingest bandwidth is constantly being increased or increased several times, during a period that preceded the estimating, and then reaches at least seventy five percent of the maximal ingest bandwidth value.

Step 320 may be further based on a duration of exceeding the ingest bandwidth limitation by the current ingest bandwidth. The maximal ingest bandwidth value depends on the number and capabilities of storage devices that accommodate the first write buffers.

According to an embodiment, step 320 includes estimating an occurrence of a burst—for example, by detecting excess bandwidth longer than a certain duration—as described above. The excess bandwidth may be the difference between the ingest bandwidth limitation and the current ingest bandwidth, when the latter exceeds the former.

According to an embodiment, step 320 is followed by step 330 of responding to the estimating.

According to an embodiment, step 330 includes entering a burst mode—as described above.

According to an embodiment, step 330 includes steps 332, 334 and 336.

According to an embodiment, step 332 includes storing at least some of the input information units at second write buffers without temporarily storing the at least some of the input information units in the first write buffers.

The first write buffers exhibit a higher storage speed than the second write buffers. The aggregate storage capacity of the first write buffers is a fraction of an aggregate storage capacity of the second write buffers.

According to an embodiment—step 332 includes storing all the input information units at the second write buffers. According to an embodiment, the storage of all the input information units occurs when an aggregate size of the input information units is expected to exceed by at least a defined factor, the aggregate storage capacity of the first write buffers. The defined factor may exceed 1, 2, 3, 4, 5, 6, and the like. According to another embodiment, the storage of all the input information units occurs when the aggregate storage capacity of the second write buffers exceeds the aggregate storage capacity of the second write buffers by a factor that is larger than e.g., 10.

According to an embodiment—step 332 includes storing only some of the input information units at the second write buffers. According to an embodiment there may be a predefined ratio between storage at the first write buffers and storage at the second write buffers—as described above.

According to an embodiment, step 334 includes reducing a rate of a migration of input information units from the first write buffers and the second write buffers to the permanent storage. The reducing may include suspending migration of most of the input information units, migrating only small input information units, or migrating only input information units that do not require intensive write workload on the storage devices that store the second write buffers, or only eliminating migration that involves large writes. The reducing may include stopping or suspending any migration.

According to an embodiment, step 336 includes introducing intentional delays in handling an ingestion of one or more newly received write requests. The introducing of intentional delays is performed when the migration is not fully stopped, or when the full migration is resumed after being stopped.

According to an embodiment, step 336 includes determining a duration of the intentional delays based on a relationship between a migration rate, an ingestion rate and a time passed since an increasing of the rate of the migration.

According to an embodiment, step 330 is followed by step 340 of determining whether the responding of step 330 prevented the occurrence of the future overflow of the first write buffers. This may include determining whether to terminate the burst mode.

When the response is YES—step 340 is followed to step 350 of returning to the steady state mode.

According to an embodiment step 350 includes steps 352, 354 and 356.

According to an embodiment, step 352 includes writing input information units only to the first write buffers.

According to an embodiment, step 354 includes increasing the rate of the migration of input information units from the first write buffers and the second write buffers to the permanent storage. The increasing may include resuming the migration in a case when the migration was suspended or limited only to certain input information units.

According to an embodiment, step 356 includes stopping the introducing of the intentional delays in handling the ingestion of one or more newly received write requests or changing the duration of the intentional delays. The duration of the intentional delays is based on the ratio between the migration rate, the ingestion rate, and the time passed since the rate of the migration was increased, or the migration was fully resumed. The duration of the intentional delays should be set so as to cause the migration rate to exceed the ingestion rate by at least e.g., 30%. The stopping the introducing of the intentional delays is applied when either (i) there is no more excess incoming bandwidth, and all the second write buffers has been migrated to the permanent storage (only first write buffers are used); or (ii) there is still excess incoming bandwidth, but the fullness of second write buffer is alleviated.

According to an embodiment, step 350 is followed by step 320.

According to an embodiment, step 356 includes selectively reducing a migration of input information units based on one or more parameters of the input information units.

Figure 4:
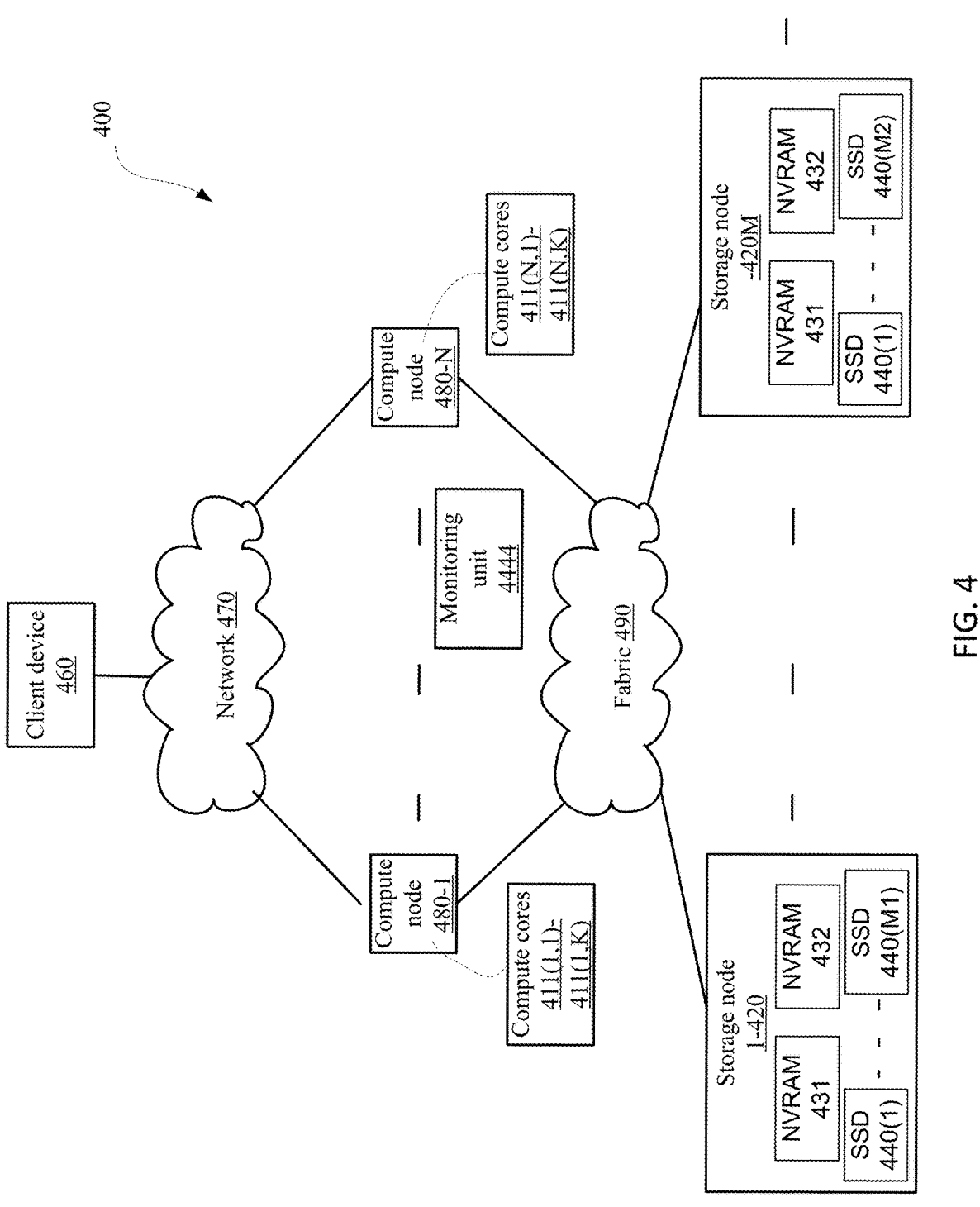
FIG. 4 is an example of a storage system.

FIG. 4 shows an example diagram of a storage system 400 for handling write buffers. The storage system 400 includes a number of N compute nodes 480-1 through 480-N. The compute nodes include (or may execute) multiple compute cores each—see for example compute cores 411(1,1)-411 (1,K) and compute cores 411(N,1)-411(N,K). A compute core can be a processing circuit, a part of processing circuit, and the like. The monitoring unit can be included in the processing circuit. The processing circuit may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits.

FIG. 4 also illustrates monitoring unit 4444 which is a computerized unit and may be implemented by one or more of the compute nodes.

Each compute node 480 interfaces with multiple client devices such as a client device 460 (or an application installed therein) via a network 470, for receiving write requests for writing input information units to the storage system.

The storage system 400 also includes a number of M storage nodes 420-1 through 420-M. The compute nodes 480 and the storage nodes 420 are connected through a communication fabric 490. M may equal N or may differ from N.

According to an embodiment, the compute nodes are configured to perform one or more steps of method 300 and to access the storage nodes for storing input information units in write buffers that reside on storage drives of the storage nodes.

The storage nodes 420 provide the storage and state in the system 400. Each storage node 420 may include a plurality of SSDs, such as SSDs 440, for example storage node 420-1 includes M1 SSDs 440(1)-440(M1). According to an embodiment, the first write buffers reside in one or more of the NVRAM 431 and 432 or similar devices, and the second write buffers reside in one or more SSDs 440 of FIG. 4.

Any reference to "may be" should also refer to "may not be".

In the foregoing detailed description, numerous specific details are set forth in order to provide a thorough understanding of the one or more embodiments of the disclosure. However, it will be understood by those skilled in the art that the present one or more embodiments of the disclosure may be practiced without these specific details. In other instances, well-known methods, procedures, and components have not been described in detail so as not to obscure the present one or more embodiments of the disclosure.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the disclosure may for the most part, be implemented using electronic components and circuits known to those skilled in the art, details will not be explained in any greater extent than that considered necessary as illustrated above, for the understanding and appreciation of the underlying concepts of the present one or more embodiments of the disclosure and in order not to obfuscate or distract from the teachings of the present one or more embodiments of the disclosure.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system and any other component should be applied mutatis mutandis to a method that may be executed by a system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Any combination of any module or unit listed in any of the figures, any part of the specification and/or any claims may be provided. Especially any combination of any claimed feature may be provided.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an."

The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

We claim:

1. A method for managing write buffers of a storage system, the method comprising:
  receiving write requests for writing input information units to the storage system;
  estimating, by a monitoring unit of a storage system, an occurrence of a future overflow of first write buffers that are allocated, during steady state operation, to store input information units before the input information units are processed and migrated to a permanent storage;
  responding to the estimating, wherein the responding comprises:
    (i) storing at least some of the input information units at second write buffers without temporarily storing the at least some of the input information units in the first write buffers; wherein the first write buffers exhibit a higher storage speed than the second write buffers, wherein an aggregate storage capacity of the first write buffers is a fraction of an aggregate storage capacity of the second write buffers;
    (ii) reducing a rate of a migration of input information units from the first write buffers and the second write buffers to the permanent storage; and
    (iii) introducing intentional delays in handling an ingestion of one or more newly received write requests; and
  if determining that the responding prevented the occurrence of the future overflow of first write buffers, then the determining is followed by writing input information units only to the first write buffers.

2. The method according to claim 1, wherein the estimating is based on a relationship between a current ingest bandwidth and an ingest bandwidth limitation of the first write buffers.

3. The method according to claim 2, wherein the ingest bandwidth limitation is a maximal ingest bandwidth value and the method comprising estimating the occurrence of the future overflow of the first write buffers when the current ingest bandwidth reaches at least seventy five percent of the maximal ingest bandwidth value.

4. The method according to claim 1, wherein the storing of at least some of the input information units comprising storing all the input information units at the second write buffers.

5. The method according to claim 1, wherein the determining is followed by increasing the rate of the migration of input information units from the first write buffers and the second write buffers to the permanent storage.

6. The method according to claim 1, wherein the determining is followed by stopping the introducing of the intentional delays in handling the ingestion of one or more newly received write requests.

7. The method according to claim 5, comprising determining a duration of the intentional delays based on a relationship between a migration rate, an ingestion rate and a time passed since the increasing of the rate of the migration.

8. The method according to claim 1 wherein the reducing of the rate of the migration comprising selectively reducing a migration of input information units based on one or more parameters of the input information units.

9. A non-transitory computer readable medium for managing write buffers, the non-transitory computer readable medium stores instructions executable by a processor for:
  receiving write requests for writing input information units to the storage system;
  estimating, by a monitoring unit of a storage system, an occurrence of a future overflow of first write buffers that are allocated, during steady state operation, to store input information units before the input information units are processed and migrated to a permanent storage;
  responding to the estimating, wherein the responding comprises:
    (i) storing at least some of the input information units at second write buffers without temporarily storing the at least some of the input information units in the first write buffers; wherein the first write buffers exhibit a higher storage speed than the second write buffers, wherein an aggregate storage capacity of the first write buffers is a fraction of an aggregate storage capacity of the second write buffers;
    (ii) reducing a rate of a migration of input information units from the first write buffers and the second write buffers to the permanent storage; and
    (iii) introducing intentional delays in handling an ingestion of one or more newly received write requests; and
    if determining that the responding prevented the occurrence of the future overflow of first write buffers, then the determining is followed by writing input information units only to the first write buffers.

10. The non-transitory computer readable medium according to claim 9, wherein the estimating is based on a relationship between a current ingest bandwidth and an ingest bandwidth limitation of the first write buffers.

11. The non-transitory computer readable medium according to claim 10, wherein the ingest bandwidth limitation is a maximal ingest bandwidth value and the non-transitory computer readable medium that stores instructions for estimating the occurrence of the future overflow of the first write buffers when the current ingest bandwidth reaches at least seventy five percent of the maximal ingest bandwidth value.

12. The non-transitory computer readable medium according to claim 9, wherein the storing of at least some of the input information units that stores instructions for storing all the input information units at the second write buffers.

13. The non-transitory computer readable medium according to claim 9, wherein the determining is followed by increasing the rate of the migration of input information units from the first write buffers and the second write buffers to the permanent storage.

14. The non-transitory computer readable medium according to claim 9, wherein the determining is followed by stopping the introducing of the intentional delays in handling the ingestion of one or more newly received write requests.

15. The non-transitory computer readable medium according to claim 13, that stores instructions for determining a duration of the intentional delays based on a relationship between a migration rate, an ingestion rate and a time passed since the increasing of the rate of the migration.

16. The non-transitory computer readable medium according to claim 9, wherein the reducing of the rate of the migration comprising selectively reducing a migration of input information units based on one or more parameters of the input information units.

\* \* \* \* \*